L. B. ELLISON.
AUTOMOBILE DOOR.
APPLICATION FILED JAN. 24, 1919.

1,323,177.

Patented Nov. 25, 1919.

Witnesses

Inventor
Lottie B. Ellison
By Victor J. Evans
Attorney

UNITED STATES PATENT OFFICE.

LOTTIE B. ELLISON, OF RAWLES SPRINGS, MISSISSIPPI.

AUTOMOBILE-DOOR.

1,323,177.                Specification of Letters Patent.        Patented Nov. 25, 1919.

Application filed January 24, 1919. Serial No. 272,856.

*To all whom it may concern:*

Be it known that I, LOTTIE B. ELLISON, a citizen of the United States, residing at Rawles Springs, in the county of Forrest and State of Mississippi, have invented new and useful Improvements in Automobile-Doors, of which the following is a specification.

My present invention pertains to automobiles and other vehicles and more particularly to the doors thereof.

The object of my invention is to provide a door for an automobile or other vehicle, constructed with a view to contributing to the passenger carrying capacity of the vehicle.

To the attainment of the foregoing the invention consists broadly in a door having an adjustable section and means whereby the adjustable section may be fastened to the remainder of the door in such manner as to afford an opening below the door through which opening a person may position the limbs while sitting on the floor of the car body and with the feet resting on the step at the side of the body.

The invention also consists in the door characterized as stated, considered as an article of manufacture and applicable to vehicle bodies such as at present in use, and in the said door in combination with a vehicle body.

With the foregoing in mind the invention will be fully understood from the following description and claims when the same are read in connection with the drawings, accompanying and forming part of this specification, in which:

Fig. 2 is a similar view with the lower section of the door fastened in its raised position to afford the opening before alluded to.

Similar numerals of reference designate corresponding parts in all of the views of the drawings.

Figure 1:
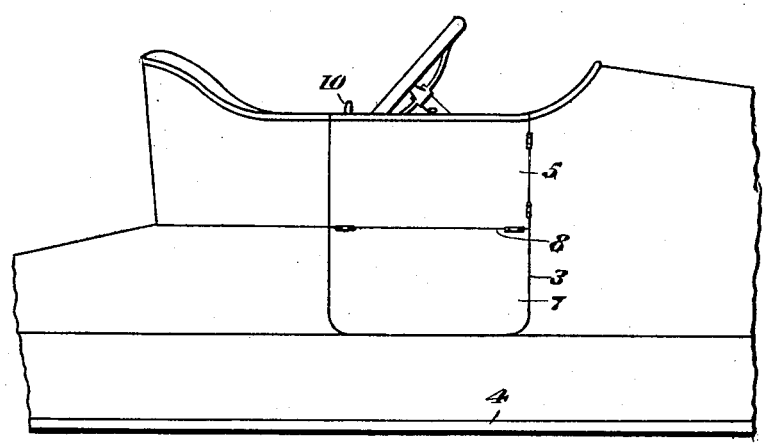
Figure 1 is a view of so much of a vehicle body as is necessary to illustrate the application of my improvement.

The body illustrated is provided with the conventional floor 1, side wall 2, and door opening 3 therein, as well as the side step 4, connected with and carried by the body in convenient position with respect to the door opening 3.

The upper section 5 of my novel door is hinged to the body wall 2 at one end in the ordinary manner or in any other manner compatible with the purpose of my invention. The said section 5 in furtherance of my invention is provided with a fastener member 6 which may be of any desired construction and which is located by preference at or adjacent to the upper edge of the section 5.

Also in furtherance of my invention a lower door section 7 is connected at 8 and preferably in a hinged manner to the section 5. The hinge connection 8 is preferred because of its simplicity and cheapness and also because it permits of the section 7 being readily swung upwardly into lapped relation to the section 5 for the purpose stated. The section 7 in accordance with my invention is provided with a fastener member 9, complementary to the member 6, the scheme being to engage the member 9 with the member 6 when the section 7 is swung upwardly, and thereby securely retain the section 7 in its raised position. When desired the section 5 may be provided at 10 with a handle which is not of the essence of my invention and may therefore be of any desired type. My invention also contemplates the use of a cushion designed to be placed on the floor of a vehicle body to form a comfortable seat for the extra-passenger. This cushion, however, I have deemed it unnecessary to illustrate.

My novel door under normal conditions is adapted to be used in the manner common to one-piece automobile doors. When, however, the occasion rises for the transportation of an extra-passenger, the section 7 is swung to and is secured in the raised position stated so as to enable the extra-passenger to sit upon the floor of the body and with the limbs extended through the opening afforded below the door, and with the feet resting upon the step 4. Manifestly in the position stated the extra-passenger is enabled to ride with comfort and without subjecting the other passengers of the car to discomfort.

It will also be manifest from the foregoing that the door section 7 may be fastened in raised position during warm weather with a view to rendering the car more cool and comfortable than would be the case were the door opening fully occupied by the closed door.

Notwithstanding its practical advantages as set forth in the foregoing, my novel door is but little more expensive than an ordinary vehicle door and when constructed in a workmanlike manner and suitably embellished my novel door is calculated to enhance rather than detract from the finished appearance of a vehicle body.

Figure 2:
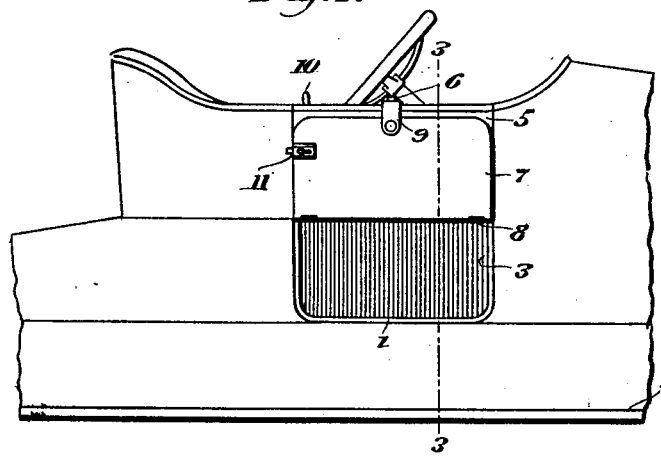
Figure 3:
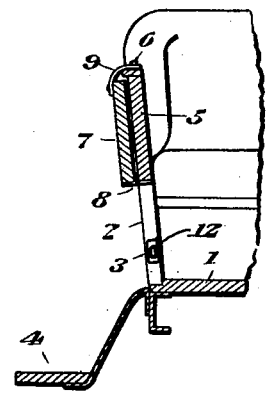
Fig. 3 is a transverse section taken in the plane indicated by the line 3—3 of Fig. 2 and showing the arrangement of my novel and advantageous door relative to the side wall of the body of the vehicle and also relative to the floor of the body and the step provided at the side of the body.

In order to prevent casual opening of the lower door section 7 when the car is in motion, I prefer to provide the door section 7 with a latch 11 adapted to coöperate with a keeper 12 in one end wall of the door opening 3. See Figs. 2 and 3. Manifestly the said latch 11 will preclude casual swinging or opening of the door section 7, and yet when it is desired to put my invention into use, the same may be readily accomplished by first disengaging the latch 11 from its complementary keeper 12, and then swinging the door section 7 to and detachably secure this in the raised position shown in Figs. 2 and 3.

Having described my invention what I claim and desire to secure by Letters-Patent is:

1. The combination with a vehicle body having a floor, a wall extending above the floor, and an unobstructed door opening in said wall, and also having a step at the outer side of said wall, below said door opening, of a door comprising an upper section connected at one side edge with the upper portion of one upright wall of said opening in the body wall, a lower section hinged at its upper edge to the lower edge of the upper section and movable upwardly in its entirety to afford an unobstructed opening below the sections, and means complementary to the upper section and lower section for detachably fastening the latter in its raised position.

2. The combination with a vehicle body having a floor and a wall in which is an unobstructed door opening extending upwardly from the floor and also having a step at the outer side of said wall below said door opening, of a door comprising an upper section hinged to said wall of the body and arranged to swing laterally, and a lower section adjustably connected with the upper section and adapted to be moved in its entirety upwardly and detachably fastened in lapped relation to the upper section to afford an unobstructed opening below the door, whereby with the door closed a person may sit upon the floor of the car and extend his limbs through the opening below the lapped door sections and rest his feet on the step.

In testimony whereof I affix my signature.

Mrs. LOTTIE B. ELLISON.